United States Patent
Dewulf

(10) Patent No.: US 11,189,880 B2
(45) Date of Patent: Nov. 30, 2021

(54) FEED-THROUGH FORMING A TERMINAL FOR A METAL-ION ELECTROCHEMICAL ACCUMULATOR, INTEGRATING A GAS RELIEF VALVE, ASSOCIATED ACCUMULATOR

(71) Applicant: COMMISSARIAT A L'ENERGIE ATOMIQUE ET AUX ENERGIES ALTERNATIVES, Paris (FR)

(72) Inventor: Frédéric Dewulf, Voiron (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 242 days.

(21) Appl. No.: 15/994,674

(22) Filed: May 31, 2018

(65) Prior Publication Data

US 2018/0351145 A1   Dec. 6, 2018

(30) Foreign Application Priority Data

Jun. 2, 2017 (FR) ..................................... 1754918

(51) Int. Cl.
| | |
|---|---|
| *H01M 50/333* | (2021.01) |
| *F16K 17/04* | (2006.01) |
| *F16K 29/00* | (2006.01) |
| *H01M 50/543* | (2021.01) |

(Continued)

(52) U.S. Cl.
CPC ....... *H01M 50/333* (2021.01); *F16K 17/0406* (2013.01); *F16K 29/00* (2013.01);
(Continued)

(58) Field of Classification Search
None
See application file for complete search history.

(56) References Cited

U.S. PATENT DOCUMENTS 5,258,242 A * 11/1993 Dean .................. H01M 2/1276
429/54
5,879,831 A    3/1999 Ovshinsky et al.
(Continued)

FOREIGN PATENT DOCUMENTS

| DE | 102013203037 A1 | 8/2014 |
|---|---|---|
| EP | 1233463 A2 | 8/2002 |

(Continued)

OTHER PUBLICATIONS

International Search Report issued in French Patent Application No. 1754918, dated Jan. 31, 2018.

(Continued)

*Primary Examiner* — Wyatt P McConnell
(74) *Attorney, Agent, or Firm* — Arent Fox LLP

(57) ABSTRACT

The invention relates to a feed-through comprising a terminal for a metal-ion electrochemical accumulator, produced through an orifice emerging either side of a wall comprising two opposite faces, comprising:
  a closure means in abutment against the chamfer of at least one through passage forming a seat inside the feed-through;
  a compression means housed in the through duct, the compression means being adapted to keep the closure means pressed against its seat along a continuous peripheral surface, up to a predetermined pressure of the gases prevailing inside the accumulator, beyond which pressure said gases may escape towards the outside of the accumulator through the passage and the through duct.

19 Claims, 4 Drawing Sheets

(51) Int. Cl.
    *H01M 10/0525* (2010.01)
    *H01M 10/0587* (2010.01)
    *H01M 10/05* (2010.01)
    *H01M 50/317* (2021.01)
(52) U.S. Cl.
    CPC ... *H01M 10/0525* (2013.01); *H01M 10/0587* (2013.01); *H01M 50/543* (2021.01); *H01M 10/05* (2013.01); *H01M 50/317* (2021.01); *H01M 2220/20* (2013.01)

(56) References Cited

U.S. PATENT DOCUMENTS

| | | | | |
|---|---|---|---|---|
| 2002/0114991 A1* | 8/2002 | Hallifax | ............... | F16K 17/0406 |
| | | | | 429/53 |
| 2005/0164081 A1* | 7/2005 | Ogura | ................. | H01M 10/052 |
| | | | | 429/185 |
| 2009/0147441 A1* | 6/2009 | Yoshida | ............... | H01M 50/333 |
| | | | | 361/502 |

FOREIGN PATENT DOCUMENTS

| | | | |
|---|---|---|---|
| JP | 2001-507856 A | | 6/2001 |
| JP | 2015-518254 A | | 6/2015 |
| WO | WO 98/31059 A1 | | 7/1998 |

OTHER PUBLICATIONS

Communication dated Jun. 17, 2019, from the Japanese Patent Office in counterpart application No. 2018-105924.

* cited by examiner

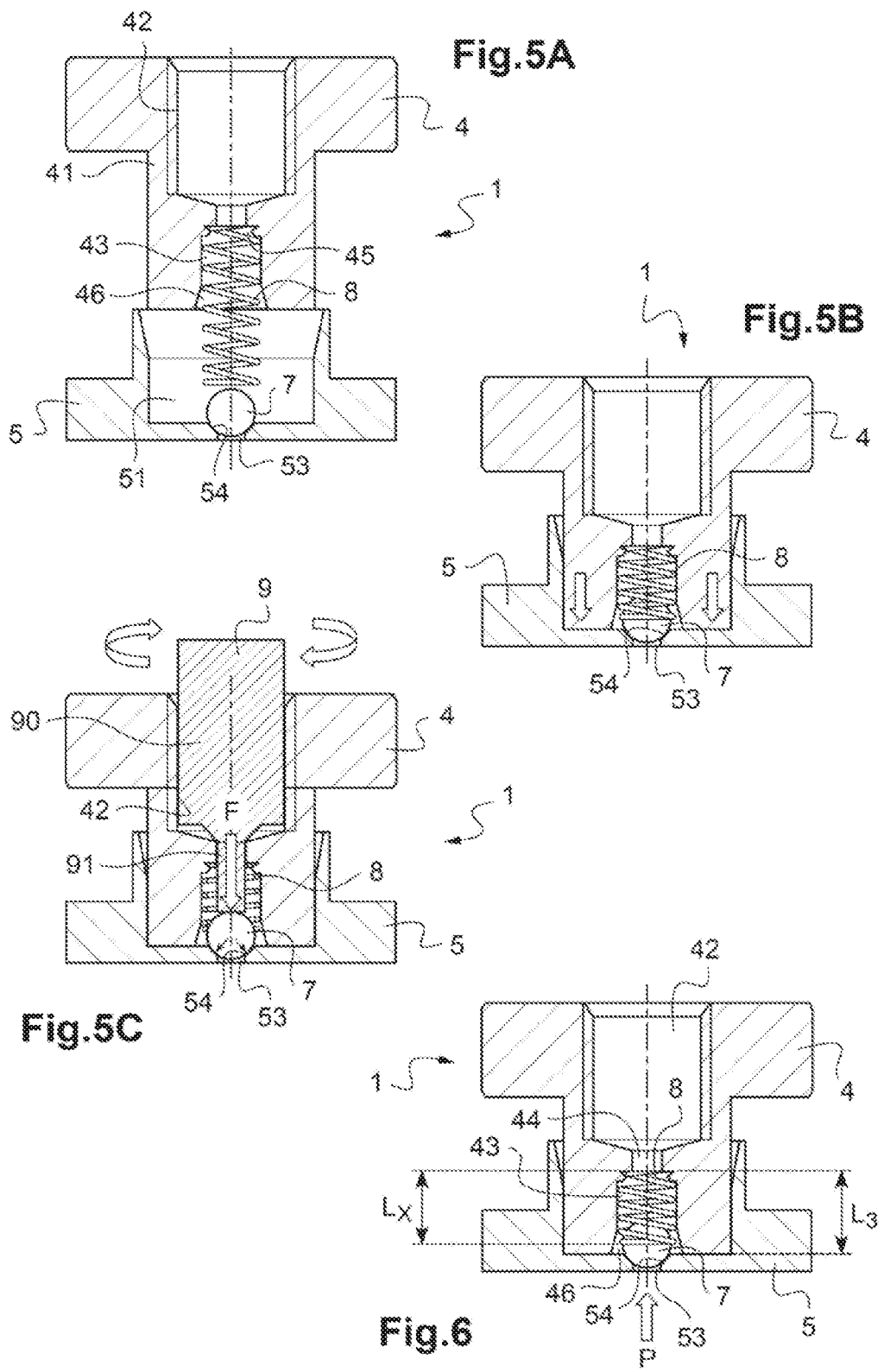

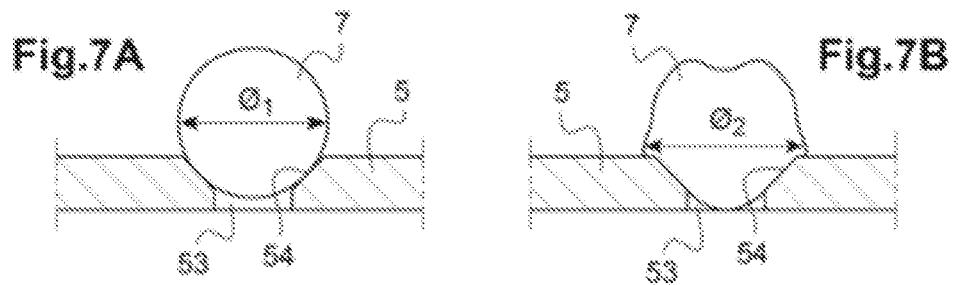
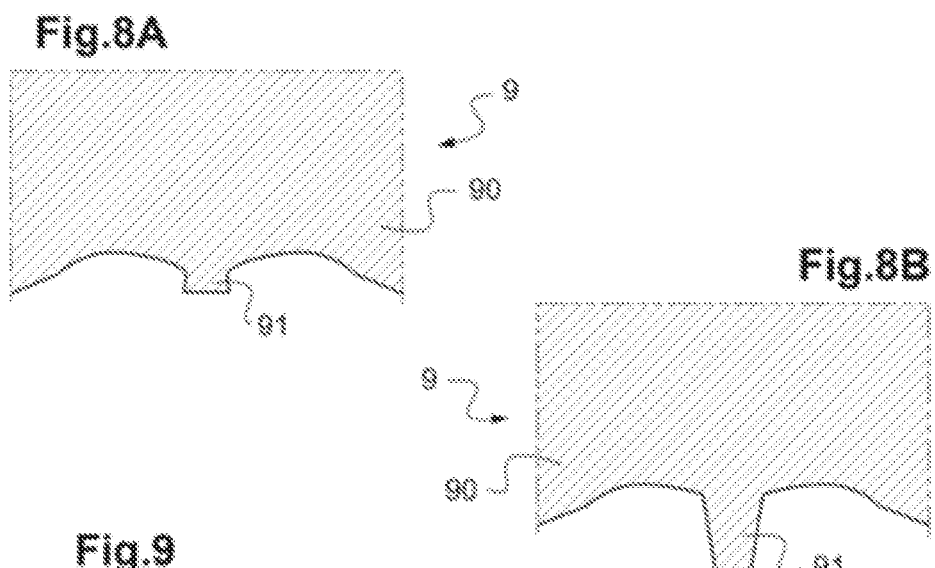
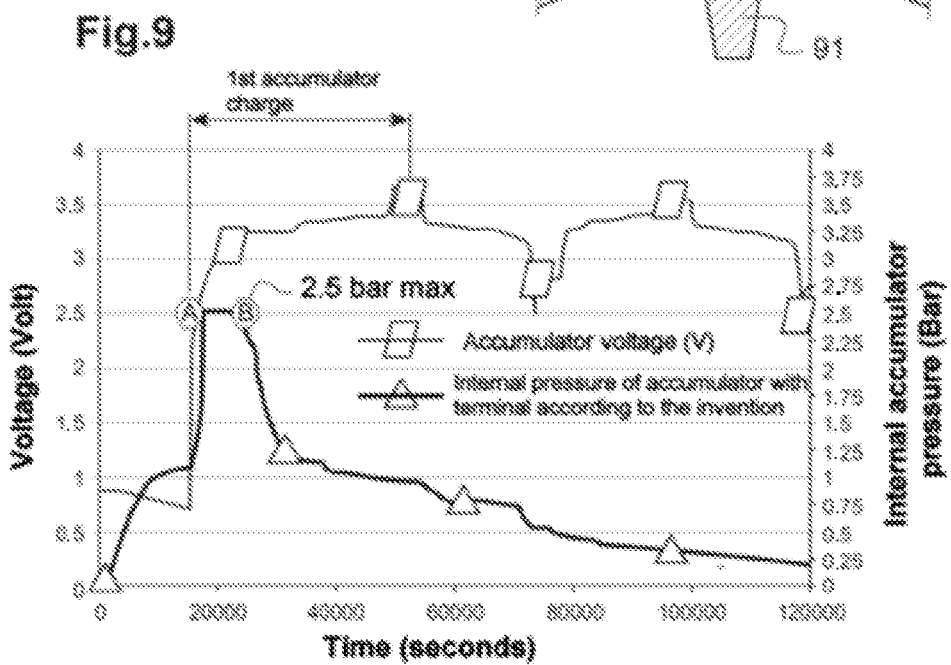

FEED-THROUGH FORMING A TERMINAL FOR A METAL-ION ELECTROCHEMICAL ACCUMULATOR, INTEGRATING A GAS RELIEF VALVE, ASSOCIATED ACCUMULATOR

CROSS-REFERENCE TO RELATED APPLICATION

This application claims priority from French Patent Application No. 1754918 filed Jun. 2, 2017. The entire contents of this application is incorporated herein by reference.

TECHNICAL FIELD

The present invention relates to the field of metal-ion, in particular lithium-ion, electrochemical generators that operate according to the principle of inserting or disinserting or, in other words, interposing-disinterposing, metal-ions in at least one electrode.

The invention particularly relates to high-capacity, typically greater than 10 Ampere-hour (Ah), metal-ion electrochemical accumulators having a capability for the passage of high currents, typically greater than 250 A.

More specifically, the invention relates to the production of a relief device, in the form of a valve, for the gases generated during the operation of the accumulator.

Even though it is described with reference to a lithium-ion accumulator, the invention is applicable to any metal-ion electrochemical accumulator, i.e. also sodium-ion, magnesium-ion, aluminum-ion, etc.

PRIOR ART

A lithium-ion battery or accumulator normally comprises at least one electrochemical cell formed by an electrolyte component between a positive electrode or cathode and a negative electrode or anode, a current collector connected to the cathode, a current collector connected to the anode and, finally, a package arranged to contain the electrochemical cell in a sealed manner while being passed through by part of the current collectors.

The electrolyte component may be in solid, liquid or gel form. In this latter form, the component may comprise a separator made of polymer or a microporous composite soaked in organic electrolyte(s) or may be of the ionic liquid type that allows lithium-ion to move from the cathode to the anode for a charge and, conversely, for a discharge, which generates the current. The electrolyte is generally a mixture of organic solvents, for example, carbonates, to which a lithium salt is added, typically LiPF6.

The positive electrode or cathode is composed of materials for inserting lithium cation, which are generally composite materials, such as $LiFePO_4$, $LiCoO_2$, $LiNi_{0.33}Mn_{0.33}Co_{0.33}O_2$.

The negative electrode or anode is very often composed of graphite carbon or of $Li_4TiO_5O_{12}$ (titanate material), possibly it is also silicon-based or a silicon-based formed composite.

The current collector connected to the positive electrode is generally made of aluminum.

The current collector connected to the negative electrode is generally made of copper, nickel-coated copper or aluminum.

A lithium-ion battery or accumulator clearly may comprise a plurality of electrochemical cells that are stacked one on top of the other.

Conventionally, a Li-ion battery or accumulator uses a pair of materials on the anode and the cathode that allow it to operate at a high voltage level, typically equal to 3.6 Volt.

A Li-ion battery or accumulator comprises a rigid package when the intended applications are restrictive or when a long lifetime is sought, for example with much higher withstand pressures and a much stricter required sealing level, typically less than $10^{-8}$ mbar·l/s, or in highly stressful environments such as in the aeronautics or space field.

Furthermore, a rigid package is currently composed of a metal casing, typically made of stainless steel (316L stainless steel or 304 stainless steel), aluminum (Al 1050 or Al 3003) or titanium.

Currently, two types of rigid casing are manufactured.

The first type consists in a rigid casing formed with a machined base and a cover soldered together by laser on their periphery. The current collectors are partly formed by metal wires or pins. The one or more pin(s) is/are soldered by electric or ultrasonic soldering to the part of the corresponding current collector that is connected to one of the electrodes of an electrochemical cell or a stack of electrochemical cells. In order to produce the electric insulation between the metal cover of the casing and the metal pin, a glass ball glazes the pin, thus forming what is commonly called a glass-metal feed-through. Furthermore, in order to provide the seal with the casing cover, a ring around the glass ball, which is generally made from the same metal as that of the casing, is soldered thereto. Some configurations provide for the use of a single glass-metal feed-through, with the casing forming the other terminal also being called pole of the accumulator.

The second type also consists in a rigid casing formed with a stamped cup and a cover soldered together by laser on their periphery. However, the current collectors comprise a feed-through with a part projecting on the top of the casing and forming a terminal, also called apparent pole of the battery.

The various types of feed-through are disclosed in patent application FR 2989836, which in particular proposes a feed-through forming a terminal of a Li-ion accumulator, which allows the passage of very high currents, typically greater than 100 A, with average voltage levels below the conventionally used 3.6 Volt.

Furthermore, a known problem in Li-ion accumulators is that of gas generation during the electric formation step and during the operation of the accumulators.

Indeed, after the electric formation cycle of the accumulator, in some cases mechanical deformations of the accumulator casing have been observed. This suggests that gas generation occurs during this electric formation cycle.

Typically, for a prismatic accumulator format, a dilation of the large faces is mainly observed with a resultant increase in thickness at the end of electric formation. This dilation is shown by the arrows in FIG. 1, where the prismatic-shaped large faces of the casing 10 plastically deform by separating from each other.

Similarly, for a cylindrical accumulator format with a large diameter, typically with a diameter of more than 25-30 mm, a deformation can be observed on the base of the accumulator and/or on the cover equipped with terminals forming the positive and negative poles, this deformation may reach a value of 1 to 2 mm in the worst cases. This deformation is shown by the arrows in FIG. 2, where the base and the cover 3 equipped with a negative terminal forming a feed-through 1 and a positive terminal 2 plastically deform. This deformation is the result of an increase in pressure inside the accumulator that is normally observed during the first electric formation cycle of the accumulator.

The inventors have already carried out tests measuring the internal pressure during the first electric formation cycles of a Li-ion accumulator. These tests served to highlight this phenomenon of an increase in gaseous pressure inside an accumulator.

FIG. 3 shows, in the form of graphs, the result of the tests carried out for a cylindrical format, 50-125 type Li-ion accumulator with LiFePO$_4$/Graphite type electrochemistry.

One of the curves shows the recording of the voltage on the accumulator terminals during the charge and discharge phases, whereas the second curve shows the evolution of the pressure inside the accumulator measured during the first two complete cycles during this electric formation phase.

The second curve shows an increase in internal pressure that is maintained for about the first three hours of the first electric charge cycle, with a pressure peak that is established at a value of approximately 5.4 bar.

It is to be noted that, at the same time, the electrochemical activity that generates this pressure increase regulates above 3.0 V.

In the right-hand side of the second curve, a phenomenon of gas recombination is a priori shown that leads to a progressive drop in the internal pressure below 1 bar in a stabilized manner from the second electric charge/discharge cycle.

With the internal pressure level having been reached, greater than 5 bar in the example, an irreversible deformation of the base of the cup of the accumulator casing of approximately +0.5 mm could be observed.

However, this plasticization of the base of the cup of the accumulator can become problematic, in particular when seeking to produce an assembly of modules each formed by a plurality of accumulators, as the dimensions can significantly evolve, as in this case with the total height of an accumulator.

It is easy to understand that, within the scope of the aforementioned example, being able to relieve the gases generated during the first electric charge step would have been advantageous, i.e. during the voltage increase phase, which, in the example, is included in a range of 0.5 V and 3.0 V, approximately. Indeed, relieving the gases would have allowed both of the following to be avoided:
  mechanically stressing the walls of the accumulator casing and thus generating an irreversible deformation of some surfaces of the casing; and
  internally storing gases inside the accumulator, with the composition of the gases not necessarily being advantageous for the electric performance and the ageing of the accumulator.

Various devices for relieving gases generated inside electrochemical accumulators in the event of overpressure are already known.

A first type of device, which is particularly common for cylindrical format Li-ion accumulators, particularly in the 18650 format, involves using a pre-cut line, also called break line, to weaken part of the casing, more specifically the cover. This break line generally forms a disk that is designed to perforate beyond a predetermined pressure, which allows the gases to escape towards the outside of the accumulator. Such a break disk device allows the internal pressure to drop until a pressure balance is reached with the pressure of the ambient environment. The major disadvantage of a break disk is that it can be considered to be "irreversible" since the accumulator cannot continue to operate once the wall of the disk is broken.

A second known type of device for relieving gases in the event of internal overpressure is that which is normally integrated in the cover of a cylindrical accumulator with Ni-MH or Ni—Cd type electrochemistry. In this type of device, a cylindrical and solid EPDM elastomer type part is centered in the cap that is located above the cover. This cylindrical elastomer part is compressed between the base of the cover and the cap, which allows a seal to be provided between a passage through the base of the cover and an opening forming a vent on the side of the cap. For a defined pressure, generally included in a range of 3 and 6 bar, the elastomer part will further compress, enough to allow the gases inside the accumulator to progressively escape. After the gases are relieved, the pressure inside the accumulator drops to a lower value, of approximately 2-3 bar, which allows the elastomer part to return to its initial position. The passage through the cover is again blocked, the accumulator is again sealed and the gases may no longer escape. The advantage of this second device is that it may be considered to be reversible insofar as continuous operation may be guaranteed throughout the entire lifetime of the accumulator after the elastomer part is opened. The disadvantage of this second device is that it cannot be applied to a Li-ion accumulator due to a problem with respect to the chemical incompatibility of the constituent material of the elastomer part, particularly with respect to the commonly used lithium salt-based electrolytes, of the LiPF$_6$, LiClO$_4$, or even of the LiTFSI type.

Furthermore, the various proposed gas relief devices may involve additional spatial requirement in the accumulator.

Therefore, a requirement exists for improving the production of gas relief devices for a metal-ion electrochemical accumulator, particularly so that they may be compatible with the electrochemistry of the accumulator materials, reversible, i.e. provide continuous operation after the gases are relieved, and compact.

DISCLOSURE OF THE INVENTION

To this end, the invention relates to, according to one of its aspects, a feed-through forming a terminal for a metal-ion electrochemical accumulator, produced through an orifice emerging either side of a wall comprising two opposite faces, comprising:
  a closure means in abutment against the chamfer of at least one through passage forming a seat inside the feed-through;
  a compression means housed in the through duct, the compression means being adapted to keep the closure means pressed against its seat along a continuous peripheral surface, up to a predetermined pressure of the gases prevailing inside the accumulator, beyond which pressure said gases may escape towards the outside of the accumulator through the passage and the through duct.

According to a variation, the feed-through comprises:
  two electrically insulating washers, each comprising a surface abutment portion in pressured abutment against one of the faces of the wall and a guide portion projecting relative to the abutment portion and in contact with the edge of the orifice;
  two electrically conductive parts, a portion of the male part being tightly fitted in a bored portion of the female part, each of the conductive parts comprising an abutment portion in pressured surface abutment against an abutment portion of the washers, the base of the bored portion being perforated with the through passage with a chamfer, the fitted portion of the male part comprising at least one duct emerging both outside the accumulator and facing the through passage of the female part.

According to an advantageous embodiment, the compression means is a compression spring.

According to another advantageous embodiment, the closure means is a ball, the compression means being adapted, on the one hand, to allow the passage of the end of a tool so as to allow an initial plastic deformation of the ball by pressing against its seat and, on the other hand, to keep the deformed ball pressed against its seat up to the predetermined pressure of the gases prevailing inside the accumulator, beyond which pressure said gases may escape towards the outside of the accumulator. The initial plastic deformation thus allows a definite guarantee of a perfect seal, typically at a level below $10^{-8}$ mbar·l/s for helium.

The term "feed-through" is understood in the normal sense, i.e. a device used to pass an electrically conductive element through a wall and to insulate the conductor from this wall. The conductive element and the feed-through wall have different polarities and are thus electrically insulated by electrically insulating parts that may also form a seal.

Thus, the inventors have carefully considered installing a device for relieving gases from the accumulator, preferably formed by a ball valve that advantageously is plastically deformed, even within a feed-through forming one of the terminals of the accumulator, said feed-through also being mechanically robust by its very constitution.

To a certain extent, the valve forms a reversible movement valve allowing the gases generated during the operation of the accumulator to escape in the event of internal overpressure.

The integration of the valve according to the invention is advantageous since it occurs in a substantially equivalent space to that of a feed-through forming a sealed wall terminal in the metal-ion accumulators, such as those disclosed in patent applications FR 2989836 and that filed in France, in the name of the applicant, on 7 Sep. 2016 under number FR 1658288.

In other words, the gas relief device, formed by the valve, preferably a ball valve, does not modify the geometry of the accumulator, since the integration of the closure means, such as the ball and its compression means, occurs in the space dedicated to the production of one of the terminals of the accumulator.

In nominal operation, the perfect seal of the accumulator is provided, on the one hand, between the female part and the wall of the accumulator that supports the feed-through by means of the lower insulating washer and, on the other hand, by the closure means, such as the ball, which has possibly undergone plastic deformation, kept in abutment by the compression means against its seat produced around the through hole of the female part.

The term "perfect seal" is understood to mean a seal according to a level taken from among the strictest required levels, typically below $10^{-8}$ mbar·l/s for helium.

The constituent materials of the closure means, such as the ball and the compression means according to the invention, must comply with a certain number of constraints.

Thus, the constituent material of the closure means (ball) must:
- be compatible with the electrochemistry used in the metal-ion accumulator and ensure very good chemical resistance to prevent, on the one hand, any risk of corrosion and potential source of pollution of the inside of the accumulator and, on the other hand, any damage to its surface through chemical attack originating from the various salts and solvents contained in the electrolyte or the gases that form during the operation of the accumulator. Indeed, a chemical alteration to the surface of the ball could undermine the seal obtained at the interface between the ball surface and its seat, i.e. the profile of the through hole perforated through the base of the female part;
- be compatible with the material selected for the female part of the terminal;
- have more reliable mechanical characteristics than those of the material used for the female part of the terminal to allow, during the final step of the assembly of the feed-through, plastic deformation of the ball to be effected in order to ensure the seal at the interface between the ball surface and its seat, at the required level as indicated above.

According to a first variation, the female part is made of a Cu—Al copper grade, in the H14 type strain-hardened state, whereas the ball is made of a Cu—Al copper grade in the zero state.

According to a second variation, the female part is made of a 1050 aluminum alloy grade, in the H14, H16 or H18 type strain-hardened state, whereas the ball is made of an aluminum grade in the 0-type annealed state. A 1050 grade is perfectly compatible with the materials that may form the electrochemical core of a metal-ion accumulator, comprising silicon, titanate or sodium-based active insertion materials, an LiPF6 based electrolyte for a Li-ion accumulator, etc. Furthermore, this aluminum grade is similar to that normally used for aluminum-based current collectors and electrode strips.

The constituent material of the compression means must, in particular:
- allow a force to be rendered subject to compression corresponding to the targeted pressure level, typically greater than 2 bar pressure, to maintain a seal at the interface between the surface of the closure means, such as the ball and the seat (chamfer);
- be compatible with the electrochemistry used in the metal-ion accumulator and ensure excellent chemical resistance to avoid any damage to its surface through chemical attack originating from the various salts and solvents contained in the electrolyte or the gases that form during the operation of the accumulator.

Preferably, the compression means, such as the compression spring, is made of AISI 316 or 316L, or even of AISI 304 or 304L, grade stainless steel.

The male part advantageously can be a copper-based alloy, preferably a Cu—Al electrolytic copper or a nickel-coated copper or an aluminum-based alloy, preferably a 5754 grade. The advantage of nickel-coated copper is that it has the same chemical nature as that defined for a conventional negative copper terminal, which allows an identical interface to be maintained with respect to a user even if the electrochemistry of the accumulator differs from conventional electrochemistry. A 5754 grade has very good mechanical characteristics and maintains integrity when a pressure is applied to its surface, particularly when crimping the male part in the female part.

Preferably, the chamfer on which the closure means comes into abutment is a conical chamfer, preferably at 45°.

More preferably, the through duct comprises a central tapped hole of the male part.

According to an advantageous variation, the tight fitting of the fitted portion of the male part in the bored portion of the female part is an N9p7 type fitting, in particular for a bore diameter of approximately 6 mm for the bored portion.

It is to be noted that the considered N9p7 fitting is the fitting according to the ISO fittings system.

The advantages of a feed-through integrating a gas relief valve, with a ball according to the invention, are numerous, the following of which can be cited:
- the possibility of implementing low pressure degassing of the accumulator at any time in the event of an increase in its internal pressure and in various situations such as electric formation, in the event of internal heating capable of generating gas, in the event of use in abusive conditions, for example, with an excessively high external temperature, typically greater than +70° C., in the event of excessively high charge or discharge currents, in the event of external short-circuit;
- the fact that it is a reversible solution, i.e. that ensures continuous operation of the accumulator following gas relief: when the internal pressure drops down, typically below 2 bar, the gas and/or liquid leak originating from inside the accumulator ceases through the closure of the through hole in the female part of the feed-through by virtue of the closure means, such as the ball, until the internal pressure possibly increases again if the cause that is the source of gas generation is still present;
- limiting the gas volumes that may escape from the accumulator through the opening of the through passage at low pressure;
- the compatibility with any metal-ion accumulator electrochemistry;
- the fact that additional manufacturing constraints are avoided. Thus, the device forming a gas discharge valve according to the invention is operational from the electric formation of the accumulator. As this device according to the invention is integrated in a fully closed terminal of the accumulator, there is therefore no need to carry out the step of electric formation of the accumulator by leaving the casing of said accumulator open to relieve any gas production, then by finally closing the accumulator after the electric formation;
- producing the assembly of the accumulator according to the invention with its sealed closure can be carried out in an anhydrous assembly room, whereas the electric formation operation and the final post-formation step can be carried out outside the anhydrous room.

The invention further relates to, according to yet another aspect, a metal-ion battery or accumulator comprising a casing with a cover, through which a feed-through as previously described is produced.

According to one feature, the male part is of the internally threaded type and projects towards the outside of the casing.

The cover can be made of aluminum, such as 1050 or 3003 aluminum.

According to an advantageous configuration, the female part of the feed-through is made of aluminum alloy and is soldered to an aluminum-based current collector that is soldered to an aluminum-based electrode strip supporting an active material for inserting metal-ions, preferably selected from a titanate-based material, such as lithium titanate oxide $Li_4TiO_5O_{12}$, a silicon-based material, a sodium-based material.

According to another advantageous configuration, the female part of the feed-through is Cu—Al copper-based and is soldered to a copper-based current collector that is soldered to a copper-based electrode strip supporting an active material for inserting metal-ions, preferably selected from a titanate-based material, such as lithium titanate oxide $Li_4TiO_5O_{12}$, a silicon-based material, a sodium-based material.

Finally, the invention relates to a method for producing a feed-through as previously described, wherein the following steps are performed:

a/ inserting one of the guide portions of the washers through the orifice, from each of the two opposite faces of the wall, so that they are in abutment against the edge of the orifice of the wall;

b/ inserting the aluminum female part into one of the washers from a face of the wall;

c/ housing the closure means along the axis of the through passage inside the bored portion of the female part, so that it comes to rest in surface abutment on the chamfer at the end of the through passage;

d/ housing the compression means in a part of the through duct of the male part forming a housing, so that one of the ends of the compression means is in abutment or is held on the base of the housing, whereas the other one of the ends projects beyond the portion of the male part to be fitted;

e/ press fitting, from the opposite face of the wall, the male part, so that the fitted portion of the male part is in abutment against the base of the bored portion of the female part and so that each of the abutment portions of the male and female parts is in pressured surface abutment against an abutment portion of the washers that is guided against the edge of the orifice.

The fitting according to step e/ is preferably carried out under a press with a force greater than or equal to 1 ton-force so as to obtain an N9p7 type fitting between the fitted portion of the male part and the bored portion of the female part, in particular for a bore diameter of approximately 6 mm for the bored portion of the female part.

According to an advantageous embodiment, after step e/, the method comprises the following steps:

f/ all the steps of assembling the accumulator and its casing, comprising:
  f1/ inserting an electrochemical assembly inside a lateral enclosure of the casing, said assembly comprising at least one cell wound around itself, each cell being formed by a cathode, an anode and a separator film interposed between the anode-cathode;
  f2/ completing electrical connections, on the one hand, between an end of the electrochemical assembly and the casing of the accumulator corresponding to one of the polarities and, on the other hand, between the other end of the assembly and the feed-through;
  f3/ sealed closing of the accumulator casing;
  f4/ filling the inside of the accumulator with a liquid or gel electrolyte through a fill hole in the accumulator casing, then sealed closing the fill hole;

g/ electrically connecting positive and negative terminals of the accumulator in order to produce its electric formation.

Advantageously, with the closure means being a ball, the method comprises, once the step g/ of electric formation of the accumulator is complete, the following step:

h/ inserting a pressing tool into the through duct of the male part from the outside of the accumulator through the compression means, so as to plastically deform the ball in abutment against its seat.

DETAILED DESCRIPTION

Further advantages and features of the invention will become more clearly apparent upon reading the detailed description of embodiments of the invention that is provided by way of a non-limiting illustration, with reference to the accompanying figures, in which:

FIGS. 5A, 5B and 5C are axial section views showing the various steps of producing a feed-through according to the invention integrating a gas relief device;

FIG. 6 is an axial section view of the feed-through forming a terminal of a metal-ion accumulator according to the invention obtained following the step of plastic deformation of the ball of FIG. 5C;

FIGS. 7A and 7B are detailed axial section views of the ball of the gas relief device, as it is positioned on its seat, respectively before and after the step of plastic deformation of the ball of FIG. 5C;

FIGS. 8A and 8B are detailed axial section views of two variations of a pressing tool for implementing the step of plastic deformation of the ball of FIG. 5C;

FIG. 9 shows, in the form of curves, the result of tests carried out for a cylindrical format, 50-125 type Li-ion accumulator according to the invention with $LiFePO_4$/Graphite type electrochemistry;

Figure 1:
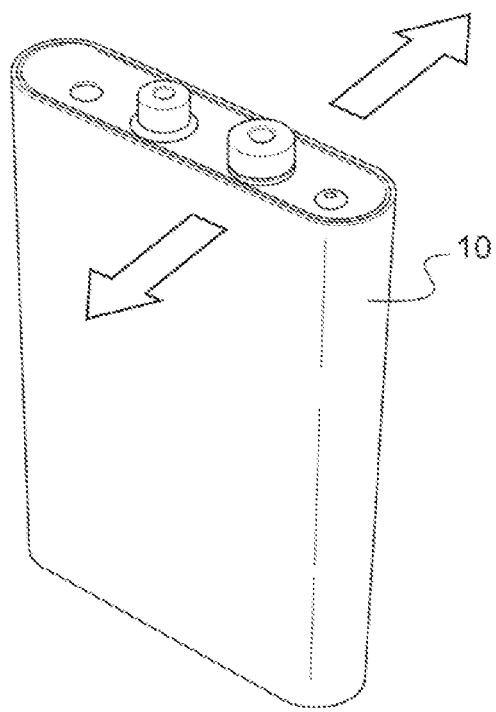
FIG. 1 is a perspective view of a Li-ion accumulator with cylindrical geometry according to an example of the prior art.
Figure 2:
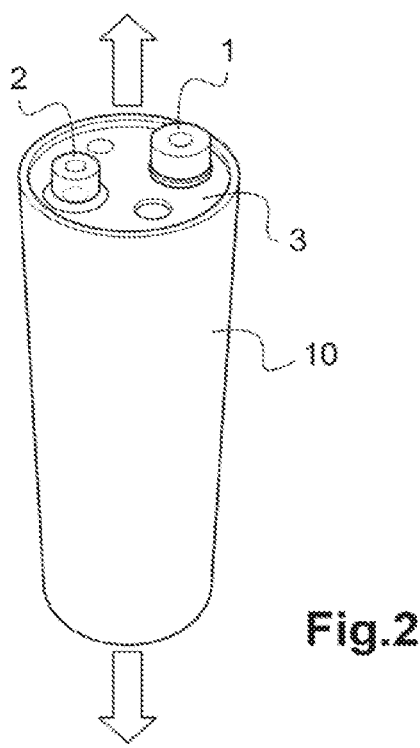
FIG. 2 is a perspective view of a Li-ion accumulator with prismatic geometry according to another example of the prior art.
Figure 3:
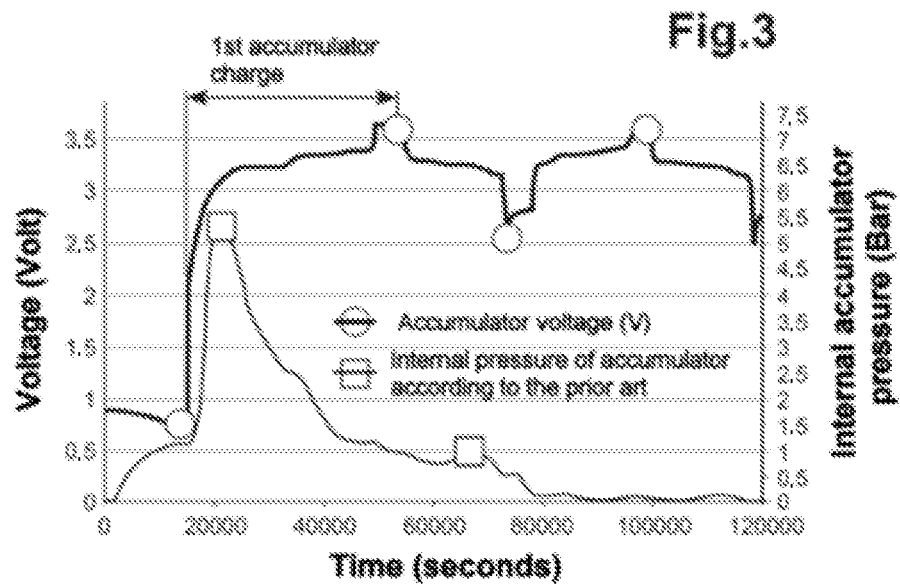
FIG. 3 shows, in the form of curves, the result of tests carried out for a cylindrical format, 50-125 type Li-ion accumulator according to the prior art with $LiFePO_4$/Graphite type electrochemistry.

FIGS. 1 to 3 relate to Li-ion accumulators according to the prior art. These FIGS. 1 to 3 have already been discussed in the preamble and therefore are not discussed further hereafter.

For the sake of clarity, the same reference numerals denoting the same feed-through elements according to the prior art and according to the invention are used for all FIGS. 1 to 9B.

Throughout the present application, the terms "lower", "upper", "low", "high", "bottom" and "top" are to be understood with reference to a vertically positioned metal-ion accumulator casing with the cover thereof on top and the feed-through projecting outside the housing towards the top.

Figure 4:
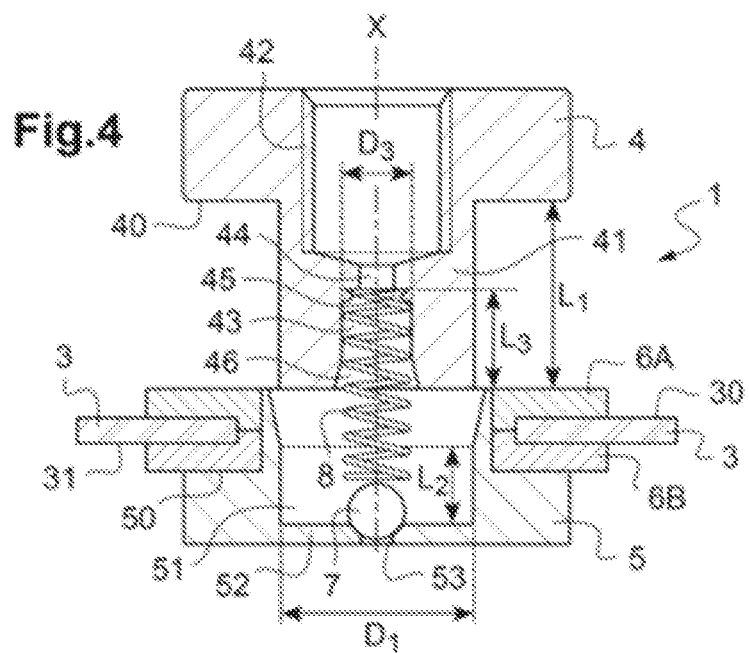
FIG. 4 is an axial section and exploded view of a feed-through forming a terminal of a metal-ion accumulator through the cover of the casing, the feed-through integrating a gas relief device according to the invention.
Figure 4A:
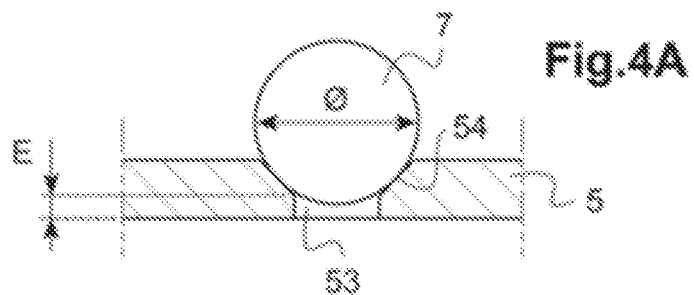
FIG. 4A is a detailed view of FIG. 4 showing the position of the ball of the gas relief device on its seat.

It is to be noted that, for the sake of clarity, the cover 3 of the accumulator casing through which the feed-through 1 according to the invention is produced, as well as the washers 6A, 6B providing the seal, are only shown in FIG. 4. It is obvious that, even though they are not shown, these elements exist for all the other views of a feed-through according to the invention.

FIG. 4 shows a first example of a feed-through forming a terminal 1 of a metal-ion accumulator integrating a gas relief device according to the invention.

The feed-through 1 according to the invention is produced through an orifice 32 emerging either side of a cover 3 of a metal-ion accumulator casing, with this cover comprising two opposite faces 30, 31. The cover 3 typically can be made of 1050 or 3003 aluminum, the electric resistivity coefficient of which is approximately 2.6 µohm·cm.

The feed-through 1 extends along an axis X parallel to the axis of the Li-ion accumulator casing.

The feed-through 1 according to the invention comprises a male part 4 tightly fitted in a female part 5. The male 4 and female 5 parts that are shown are electrically conductive, in other words, they have a low electric resistivity coefficient, typically included in a range of 1.7 and 1.9 µohm·cm. The male part 4 advantageously can be made of 5754 aluminum or of Cu—Al electrolytic copper, preferably with a nickel coating. The female part 5 advantageously can be made of 1050 aluminum or of Cu—Al electrolytic copper, preferably with a nickel coating.

Each of the male 4 and female 5 parts comprises an abutment portion 40, 50, which comes into pressured surface abutment against an upper washer 6A and a lower washer 6B, respectively. The washers 6A, 6B shown have a high electric resistivity coefficient, greater than $1.10^{15}$ µohm·cm. They can be made of polyetherimide PEI. Each washer comprises an abutment portion in direct pressured abutment against one of the abutment portions 40, 50 of the washers and a guide portion projecting relative to the abutment portion. The guide portions guide and center the female part 5 in the orifice of the cover.

The male part 4 comprises a cylindrical portion 41 that is tightly fitted in the bored hole 51 of the female part 5.

The height L1 of the cylindrical portion 41 is determined to at least ensure a minimum fitting height between the cylindrical portion 41 and the bored hole 51. Typically, the height L1 is greater than 2 mm.

The height L2 of the bored hole 51 is determined to at least ensure a minimum fitting height between the cylindrical portion 41 and the bored hole 51. Typically, the height L2 is greater than 2 mm.

Preferably, the outer diameter of the cylindrical portion 41 and the internal diameter D1 of the bored hole 51 so as to comply with press fitting subject to a force greater than or equal to 1 ton-force for this cylindrical part 41 in the bored hole 51 of the female part 5. Typically, an N9p7 type fitting is defined between these two cylindrical portions 41, 51. The assembly of the male 4 and female parts 5 and the washers 6A and B provides a perfect seal at the orifice of the cover 3.

According to the invention, the terminal 1 integrates a device for relieving gases in the event of overpressure inside the accumulator.

This device comprises a set of perforations produced in the two male 4 and female 5 parts, through which gases originating from inside the accumulator are able to pass in order to escape towards the outside of the accumulator, as well as a ball 7 and a compression spring 8.

The ball 7 diameter is greater than both the diameter outside its seat 54 and the outer diameter of the compression spring 8.

In the compressed state the compression spring 8 will allow the ball 7 to be maintained on its seat 54 in a continuous line over the entire periphery of said seat so as to obtain a perfect seal between the inside and the outside of the accumulator, under the force of the spring 8, which typically is greater than an equivalent force of 2 bar pressure through the through hole 53, above which the ball 7 is positioned.

The perfect seal level that is achieved, as will be explained hereafter, is typically less than $10^{-8}$ mbar·l/s for helium, i.e. equivalent to that of the metal-ion accumulator casing assembly, in particular around the orifice 32 of the cover 3 at the washers 6A, 6B.

More specifically, the male part 4 comprises a housing 43 intended to house the compression spring 8. This housing 43 is connected to the internally threaded hole 42, typically with a diameter of the M5 or M6 type, via a through passage 44.

Preferably, a constriction 45 is produced at the upper end of the housing 43. This constriction 45 allows the spring 8 to be kept in position after it is positioned in the male part 4.

This constriction 45 may be produced either by machining or by moving material along the wall of the bore of the housing 43 so as to form a continuous or partial line of catch-type overthicknesses positioned in threes at 120° or in fours at 90°.

The female part 5, in particular, is perforated in its base 52 at the end of the bored hole 51 of a through passage 53, the end of which 54 forms the seat of the ball 7 and which, as shown in FIG. 6, is facing the housing 43 for the spring 8.

Thus, by its very construction, without blocking by the ball 7 under the pressure force of the spring 8, the threaded hole 42, the housing 43, the through passages 44 and 53 communicate together so as to allow gases to pass from the inside of the accumulator to the outside through the male parts 4 and 5 of the feed-through 1.

The seat 54 of the ball 7 is advantageously formed by a conical chamfer, typically at approximately 45°, which allows, in addition to the aforementioned desired sealing function, the ball 7 to position itself independently along the axis X of the passage 53 and the feed-through 1 during its installation step.

Preferably, a chamfered widening 46 is produced on the lower end of the housing 43.

Preferably, the internal diameter D3 of the housing 43 for the spring 8 is defined so as to be greater than approximately 10% of the outer diameter of the spring 8. This thus avoids any friction and possibly jamming upon compression of the spring 8.

Preferably, the height L3 of the housing 43 for the spring 8 is defined so that, when the male part 4 is tightly fitted in the female part 5 with the end of the cylindrical portion 41 in abutment against the base 52 of the bored hole 51, the compression rate of the spring 8 corresponds to the level of force to be applied to the ball to contain an opening pressure that will be defined as being included in a range of two pressure values, respectively low P1 and high P2, for discharging gases from the inside of the accumulator to the outside.

In order to be compatible with the normal and desired dimensions and space for a metal-ion accumulator feed-through 1, the ball 7 advantageously is small, typically with an outer diameter included in a range of 1.6 and 3 mm.

Similarly, the ball 7 is positioned on a chamfer 54 of the through passage 53, the diameter of which is preferably included in a range of 1 and 2 mm.

When the female part 5 is made of nickel-coated Cu—Al copper, the ball 7 preferably is also made of Cu—Al copper, preferably at least 99.9% copper.

When the female part 5 is made of nickel-coated 1050 aluminum, the ball 7 is made of 1000 grade aluminum, such as 1050 aluminum, for example, with at least 99.5% aluminum.

As explained hereafter, in order to ensure a seal at the aforementioned required level on the chamfer 54 of the through hole 53, provision advantageously is made for a final step of plastic deformation of the ball 7 against the female part 5 to be carried out, when assembling the feed-through 1, as will be described hereafter.

Furthermore, in order to comply with these plastic deformation constraints, when the female part 5 of the terminal is made of nickel-coated Cu—Al copper, the following advantageous selection can be made:

for the female part 5, a Cu—Al copper grade of the H14 type in the strain-hardened state, which is expressed by breaking strength greater than 300 N/mm$^2$ with an elastic limit greater than 250 N/mm$^2$;

for the ball 7, a Cu—Al copper grade in the 0-state with annealing, which is expressed by breaking strength greater than 200 N/mm$^2$ with a maximum elastic limit of 120 N/mm$^2$.

When the female part 5 of the terminal is made of 1050 type aluminum, the following advantageous selection can be made:

for the female part 5, a 1050 aluminum grade of the H14, H16 or H18 type in the strain-hardened state, which is expressed, for the H14 state, by breaking strength greater than 105 N/mm$^2$ with an elastic limit greater than 85 N/mm$^2$;

for the ball 7, an aluminum grade in the 0-state with annealing, which is expressed by breaking strength included in a range of 65 and 95 N/mm$^2$ with a maximum elastic limit of 40-50 N/mm$^2$.

According to an advantageous variation, the difference in mechanical strength between the ball 7 and the base of the female part 5 also can be accentuated.

To this end, it is possible, as a function of the diameter of the ball 7, to increase the wall thickness E of the base to a certain extent between the lower end of the through passage 53 and the lower end of the chamfer 54.

Table 1 below provides preferred values of this thickness E as a function of the outer diameter Ø of the ball 7.

TABLE 1

| | | | | |
|---|---|---|---|---|
| Outer diameter Ø of the ball 7 (mm) | 1.8 to 2.4 | 2.4 to 2.8 | 2.8 to 3.3 | 3.3 to 4 |
| Wall thickness E of the base of the female part 5 (mm) | 2.0 to 3.0 | 3 to 3.5 | 3.5 to 4 | 4 to 5 |

In order to be compatible with the normal and desired dimensions and space for a metal-ion accumulator feed-through 1, the spring 8 advantageously is small, typically with an outer diameter less than or equal to 4 mm and a length in the free state less than or equal to 8 mm.

The compression spring 8 is preferably made of AISI 316-316L, or possibly AISI 304-304L, grade stainless steel, which also have the advantage of being grades that are widely used and are compatible with the electrochemistry of a Li-ion accumulator.

By way of an example, the compression spring 8 can be one of the wire-based springs made of 316 stainless steel marketed by SPEC.

Thus, preferably, for a cylindrical portion 41 diameter D1 of approximately 6 mm, a spring from SPEC advantageously can be selected, the features of which are summarized in table 2 below:

TABLE 2

| | |
|---|---|
| Commercial references | C0088-008-0190X |
| Material | 316 stainless steel |
| Stiffness R (N/mm) | 0.51 |
| Outer diameter (mm) | 2.24 |
| Wire diameter (mm) | 0.2 |
| Length in free state (mm) | 4.83 |

More preferably, for a cylindrical portion 41 diameter D1 included in a range of 7 and 8 mm, a spring from SPEC advantageously can be selected, the features of which are summarized in table 3 below:

TABLE 3

| Commercial references | C0120-008-0190X |
|---|---|
| Material | 316 stainless steel |
| Stiffness R (N/mm) | 0.47 |
| Outer diameter (mm) | 3.05 |
| Wire diameter (mm) | 0.25 |
| Length in free state (mm) | 6.35 |

In order to produce an accumulator with a feed-through 1 integrating the gas relief device according to the invention, the following steps are performed.

One of the guide portions of the washers 6A, 6B is inserted through the orifice 32, from each of the two faces 30, 31 of the cover, so that they are in abutment against the edge of the orifice 32.

The female part 5 is inserted into the lower washer 6B from the lower face 31 of the cover 3.

The ball 7 is placed inside the female part 5 so that it comes to rest on the chamfer 54 along the axis X of the through passage 53.

The compression spring 8 is then placed in the housing 43 of the male part 4. The spring 8 snaps into the base of the housing 43 at the constriction 5 via one of its ends, whereas the other one of its ends projects beyond the cylindrical portion 41 of the male part 4 (FIG. 5A).

The male part 4 is press fitted, from the upper face 30 opposite the lower face 31 of the cover 3. The press fitting allows each of the abutment portions 40, 50 of the male 4 and female 5 parts to be in pressured surface abutment against an abutment portion of the washers 6A, 6B, which are in pressured abutment against the edge of the orifice 32 (FIG. 5B). Furthermore, the female part 5 is in pressured abutment against the guide portions of the washers 6A, 6B, which are in pressured surface abutment against the edge of the orifice 32. Preferably, a press fitting force is applied that is at least equal to 1 ton-force in order to obtain, on the one hand, a seal between the parts 4, 5, the washers 6A, 6B and the cover 3 and, on the other hand, highly resistant cold mechanical clamping between the male 4 and female 5 parts.

At the end of this step, the obtained sealing level is already high. With the aforementioned components, a helium tested level included in a range of $10^{-5}$ et $10^{-7}$ mbar·l/s can be provided. This sealing level is sufficient for carrying out the electric formation step of a metal-ion accumulator.

The assembly of the various components of the feed-through according to the invention is then complete.

All the normal steps for assembling a metal-ion accumulator are carried out as follows:
an electrochemical assembly is inserted inside a lateral enclosure of the housing, said assembly comprising at least one cell wound around itself, each cell being formed by a cathode, an anode and a separator film interposed between the anode-cathode;
the electrical connections are completed, on the one hand, between an end of the electrochemical assembly and the casing of the accumulator corresponding to one of the polarities, for example, the positive polarity and, on the other hand, between the other end of the assembly and the terminal-feed-through 1 wall of the cover 3 of the accumulator according to the invention, which corresponds to the other one of the polarities, for example, the negative polarity);

the accumulator casing is closed in a sealed manner;
the inside of the accumulator is filled with an electrolyte liquid through a fill hole provided to this end on the cover 3 of the accumulator casing, for example. This fill hole is then reclosed to provide a perfectly sealed accumulator casing.

With the accumulator according to the invention being assembled, it is then possible to proceed to the step of electric formation by electrically connecting its positive and negative terminals to a known item of equipment.

To this end, the first charge and discharge cycles are carried out by passing a charge or discharge current through two negative and positive polarity terminals of the accumulator.

As mentioned in the preamble of this application, during this step of electric formation, which can last up to 48 to 72 hours, the internal pressure may increase, which is more generally observed during the first charge cycle.

Before this pressure increase, the previously obtained sealing level, of approximately $10^{-5}$ and $10^{-7}$ mbar·l/s for helium, is sufficient since, a priori, the air or the ambient humidity cannot enter the accumulator.

By virtue of the ball 7 and spring 8 gas relief device, as previously described, the overpressure gases will overcome the force of the spring 8 and thus lift the ball 7 and thereby will be able to be relieved outwards through the threaded hole 42, the housing 43, the through passages 44 and 53, respectively.

FIG. 9 shows, in the form of graphs, the result of tests carried out for a cylindrical format, 50-125 type Li-ion accumulator according to the invention with LiFePO$_4$/Graphite type electrochemistry, with the ball 7 and the compression spring 8 being made of the aforementioned materials and having the aforementioned dimensions.

Upon reading the curve of the pressure inside the accumulator, it can be seen that:
when the internal pressure reaches the exhaust pressure from which the ball 7 may be lifted from its seat 54, approximately 2.5 bar at point A in the example shown, gas will escape from the inside of the accumulator when gas is generated inside the accumulator;
then the ball 7 closes back onto its seat, from point B in the example shown, when this generation of gas stops.

As a final step, on completion of electric formation, provision advantageously is made for a step of plastic deformation of the ball 7, which will allow an accumulator sealing level to be permanently provided with a value that is at least greater than $10^{-8}$ mbar·l/s for helium, as explained hereafter.

This final step is shown in FIG. 5C: a pressing tool 9 is inserted into the axis X of the male part 4 of the terminal 1, then the threaded body 90 of this tool 9 is screwed into the threaded hole 42 of the terminal 1.

The threaded body 90 is extended by a cylindrical end 91, which is introduced at the center of the spring turns when the body 90 is screwed into the threaded hole 42 until this end 91 comes into contact with the upper dome of the bore 7.

As shown by the arrow F in FIG. 5C, during screwing a pressing force is transferred by the end 91 of the tool in order to press the ball 7 against the chamfer 54 and thus cause the deformation thereof. The deformation progressively moves the volume of material of the ball 7 in order to crush its faces interfacing with the entry of the chamfer 54. Plastic deformation of the ball 7 is then obtained.

This irreversible deformation of the ball 7 allows the surfaces facing the ball and the chamfered profile 54 at the end of the through passage 53 of the base of the female part 5 to coincide over a significant length and, consequently, the possible paths of gas leaks to be blocked that could have existed before the completion of the pressing operation by the tool 9.

The evolution of the shape of the ball 7 as it is pressed is respectively shown in FIGS. 7A and 7B: the ball 7 initially has a perfectly spherical diameter, which progressively increases at the chamfered entry 54 of the through passage 53 of the female part 54 through the movement of its material from the center outwards subject to the pressing force F of the tool 9.

The diameter of the ball 7 at the chamfered entry 54 thus transitions from a value $Ø_1$ (FIG. 7A) to a higher value $Ø_2$ (FIG. 7B) in its plastically deformed state. As can be seen in FIG. 7B, the contact surface between the plastically deformed ball 7 and the entry of the through passage 53 has increased relative to the initial contact surface between the non-deformed spherical ball 7 and the chamfer 54.

FIGS. 8A and 8B show two examples of different profiles 91 at the end of the pressing tool 9 of the ball. These end profiles 91 advantageously are axisymmetrical in order to apply 360° contact from the top of the ball 7. The central part of the tool 9, which is in the extension of the body 90, may be relatively long. Preferably, precedence is given to the shortest central part in the case of a ball 7 made of harder material (FIG. 8A), such as when the ball 7 is made of copper, for example. The longest central part is instead given precedence in the case of a ball 7 made of softer material (FIG. 8B), such as when the ball 7 is made of aluminum, for example.

During the step of plastic deformation of the ball 7, provision advantageously may be made for the upper surface of the terminal-feed-through 1 of the accumulator to be cleaned, in order to eliminate any traces and residues of pollution caused by the degassing during the step of electric formation.

An example of the sizing of the previously described feed-through 1 will now be described with a ball 7/compression spring 8 gas relief device to allow the gases inside the accumulator to escape when they generate a pressure of approximately 2.5 to 3 bar.

The range of operating pressures expected between the lower pressure P1 and the upper pressure P2 is determined by computing from the dimensions of the various components selected to produce the gas relief device.

The selected compression spring 8 is that marketed by SPEC, the features of which are shown in table 2 above.

The selected ball 7 is a Cu—Al copper ball with an outer diameter $Ø_1$ equal to 2.4 mm. After plastic deformation, the outer diameter $Ø_2$ is equal to at least 2.5 mm.

The diameter of the through passage 53 perforated through the base of the female part 5 is equal to 1.4 mm.

The base of the female part 5 is made of nickel-coated Cu—Al copper with an average thickness of 3.0 mm.

The ball 7 is positioned in the axis X of the through passage 53 and self-centers on the profile 54 obtained by a chamfer of between 0.4 to 0.6 mm at 45°.

The end of the bored housing 43 of the male part 4 comprises a chamfer of between 0.25 to 0.4 mm at 60°.

The dimension of the depth $L_3$ of the housing 43 for the spring 8 is now determined. This depth or height $L_3$ is equal to the sum of the length Lx of the spring 8 in the compressed state and of the overthick part of the ball 7 above the plane inside the female part 5. The dimensions $L_3$ and Lx are clearly shown in FIG. 6.

In the example shown, taking into account the outer diameter of the spherical ball 7 and the value of the chamfer 54, the surface S of the ball 7 on which the internal pressure P of the gases is applied can be considered to be approximately 1.85 mm².

It is thus possible to deduce therefrom the respective forces Fn that correspond to various levels of applied pressure of P1 to P5 between 2.5 bar and 4.5 bar by applying the formula Fn=P×S.

Table 4 summarizes the forces.

TABLE 4

| Pressures | P1 | P2 | P3 | P4 | P5 |
|---|---|---|---|---|---|
| Pressure values (bars) | 2.5 | 3.0 | 3.5 | 4.0 | 4.5 |
| Applied forces (N) | 0.462 | 0.554 | 0.647 | 0.739 | 0.831 |

Table 5 below indicates, for each of the applied forces, the compression lengths xn of the spring 8 based on the formula Fn=R*xn (with R being the stiffness of the spring), as well as the compressed spring lengths Lxn, based on the formula Lxn=Lo−xn (with Lo being the spring length in the free state).

TABLE 5

| Compression length xn of the spring 8 (mm) | | | | |
|---|---|---|---|---|
| x1 | x2 | x3 | x4 | x5 |
| 0.906 | 1.087 | 1.268 | 1.449 | 1.630 |
| Length Lxn of the compressed spring 8 (mm) | | | | |
| Lx1 | Lx2 | Lx3 | Lx4 | Lx5 |
| 3.924 | 3.743 | 3.562 | 3.381 | 3.200 |

Given the results obtained for Lx1 and Lx2, an average compressed length (Lx) can be defined for this type of spring 8 as being equal to 3.85 mm with a tolerance of +/−0.1 mm.

Based on these hypotheses, and with a ball 7 with a diameter equal to 2.4 mm and the selected spring 8 dimensions, the height $L_3$ of the housing 43 for the spring 8 that is to be provided in the bored part of the male part 8 must be included in a range of 3.8 mm and 4.3 mm.

The operating pressure of the ball 7 with its spring 8, i.e. the pressure that allows it to be lifted from its seat 54 in order to allow degassing of the inside of the accumulator, therefore is between a minimum value P1 of approximately 2.3 bar and a maximum value P2 of approximately 3.1 bar.

The feed-through 1 integrating the ball 7, spring 8 gas relief device according to the invention can be produced on a cover 3 of a Li-ion accumulator casing 10 both with a cylindrical geometry and with a prismatic geometry. In these various configurations, the terminal 1 according to the invention is negative, for example, with the positive terminal 2 also being able to be produced on the cover 3 directly by soldering, for example, as shown in FIGS. 1 and 2.

Even though it has not been previously specified, provision is made for the surface of the base of the female part 5, i.e. the section that defines its abutment surface, to be sufficient to electrically connect a connector inside the housing that is electrically connected to the electrochemical assembly that is commonly called spool, formed by one or more electrochemical cells. The electric connection between the internal connector and the base of the female part can be produced by soldering.

Other advantages and improvements may be provided without necessarily departing from the scope of the invention.

The invention is not limited to the aforementioned embodiments, in particular features of embodiments shown within non-illustrated variations may be combined together.

The term "comprising a/one" must be understood as being synonymous with "comprising at least one", unless otherwise specified.

The invention claimed is:

1. A feed-through forming a terminal for a metal-ion electrochemical accumulator, produced through an orifice emerging either side of a wall comprising two opposite faces, comprising:
    a closure means in abutment against a chamfer of at least one through passage forming a seat inside the feed-through; and
    a compression means housed in a through duct, the compression means comprising two ends and being adapted to keep the closure means pressed against the seat along a continuous peripheral surface, up to a predetermined pressure of gases prevailing inside the accumulator, beyond which pressure said gases may escape towards the outside of the accumulator through the passage and the through duct,
    wherein the closure means is a ball, the compression means being adapted, on the one hand, to allow the passage of an end of a tool so as to allow an initial plastic deformation of the ball by pressing against the seat and, on the other hand, to keep the deformed ball pressed against the seat up to the predetermined pressure of the gases prevailing inside the accumulator, beyond which pressure said gases may escape towards an outside of the accumulator, and
    wherein the ball is made in a material and the seat is made in another material so that, the material of the ball has an elastic limit lower than the elastic limit of the material of the seat to allow the plastic deformation of the ball to be performed in order to ensure the seal at the interface between the ball surface and the seat, and
    wherein the material of the ball is compatible with an electrochemistry used in the metal-ion accumulator and ensures chemical resistance to prevent, on the one hand, any risk of corrosion and potential source of pollution of an inside of the accumulator and, on the other hand, any damage to the surface of the ball through a chemical attack originating from one or more salts and solvents contained in an electrolyte or gases that form during an operation of the accumulator.

2. The feed-through according to claim 1, further comprising:
    two electrically insulating washers, each comprising an abutment portion in pressured surface abutment against one face of the faces of the wall and a guide portion projecting relative to the abutment portion and in contact with an edge of the orifice; and
    one electrically conductive female part and one electrically conductive male part, a portion of the male part being press-fitted in a bored portion of the female part, each of the conductive parts comprising an abutment portion in pressured surface abutment against an abutment portion of the washers, a base of the bored portion comprising the through passage, the through passage comprising the chamfer, a fitted portion of the male part comprising the duct emerging both outside the accumulator and facing the through passage of the female part.

3. The feed-through according to claim 1, the compression means being a compression spring.

4. The feed-through according to claim 3, the compression spring being made of AISI 316 or 316L, or even of AISI 304 or 304L, grade stainless steel.

5. The feed-through according to claim 2, the female part being made of a Cu—Al copper grade, in the H14 type strain-hardened state, whereas the ball is made of a Cu—Al copper grade in the 0-state.

6. The feed-through according to claim 2, the female part being made of a 1050 aluminum alloy grade, in the H14, H16 or H18 type strain-hardened state, whereas the ball is made of an aluminum grade in the 0-type annealed state.

7. The feed-through according to claim 2, the male part being made of a copper-based alloy or an aluminum-based alloy.

8. The feed-through according to claim 1, the chamfer of the through passage forming the seat being a conical chamfer.

9. The feed-through according to claim 2, the press-fitting of the fitted portion of the male part in the bored portion of the female part is an N9p7 type fitting.

10. The feed-through according to claim 2, the through duct comprising a tapped central hole of the male part.

11. A metal-ion battery or accumulator comprising a casing with a cover, through which the feed-through according to claim 2 is produced.

12. The metal-ion battery or accumulator according to claim 11, the male part being of an internally threaded type and projecting towards the outside of the casing.

13. The metal-ion battery or accumulator according to claim 11, the cover being made of aluminum.

14. The metal-ion battery or accumulator according to claim 11, the metal-ion battery or accumulator being a Li-ion battery or accumulator, the female part of the feed-through being made of aluminum alloy and soldered to an aluminum-based current collector that is soldered to an aluminum-based electrode strip supporting an active material for inserting metal-ions.

15. The metal-ion battery or accumulator according to claim 11, the metal-ion battery or accumulator being a Li-ion battery or accumulator the female part of the feed-through being Cu—Al copper-based and soldered to a copper-based current collector that is soldered to a copper-based electrode strip supporting an active material for inserting metal-ions.

16. A method for producing the feed-through according to claim 2, wherein the following steps are performed:
    a/ inserting one of the guide portions of the washers through the orifice, from each of the two opposite faces of the wall, so that they are in abutment against the edge of the orifice of the wall;
    b/ inserting the aluminum female part into one of the washers from a face of the wall;
    c/ housing the closure means along an axis of the through passage inside the bored portion of the female part, so that it comes to rest in surface abutment on the chamfer at an end of the through passage;
    d/ housing the compression means in a part of the through duct of the male part forming a housing, so that one of the ends of the compression means is in abutment or is held on a base of the housing, whereas the other one of the ends projects beyond a portion of the male part to be fitted; and
    e/ press fitting, from the opposite face of the wall, the male part, so that the fitted portion of the male part is in abutment against the base of the bored portion of the female part and so that each of the abutment portions of the male and female parts is in pressured surface abutment against an abutment portion of the washers that is guided against the edge of the orifice.

17. The method according to claim 16, the fitting according to step e/ being carried out under a press with a force greater than or equal to 1 ton-force so as to obtain an N9p7 type fitting between the fitted portion of the male part and the bored portion of the female part.

18. The method according to claim 16 comprising, after step e/, the following steps:
f/ all the steps of assembling the accumulator and a casing, comprising:
  f1/ inserting an electrochemical assembly inside a lateral enclosure of the housing, said assembly comprising at least one cell wound around itself, each cell being formed by a cathode, an anode and a separator film interposed between the anode-cathode;
  f2/ completing electrical connections, on the one hand, between an end of the electrochemical assembly and the casing of the accumulator corresponding to one of the polarities and, on the other hand, between another end of the assembly and the feed-through;
  f3/ sealed closing of the accumulator casing;
  f4/ filling an inside of the accumulator with a liquid or gel electrolyte through a fill hole in the accumulator casing, then sealingly closing the fill hole; and
g/ electrically connecting positive and negative terminals of the accumulator in order to produce its electric formation.

19. The method according to claim 18, the closure means being a ball comprising, once the step g/ of electric formation of the accumulator is complete, the following step:
h/ inserting a pressing tool into the through duct of the male part from the outside of the accumulator through the compression means, so as to plastically deform the ball in abutment against the seat.

* * * * *